Sept. 18, 1934.  P. SWANSON ET AL  1,974,381
FISHING TACKLE
Filed Aug. 28, 1931

Inventors
Peter Swanson.
Roy Baxtrum.
By Geo. Stevens
Attorney

Patented Sept. 18, 1934

1,974,381

UNITED STATES PATENT OFFICE 1,974,381

FISHING TACKLE

Peter Swanson and Roy Baxtrum, Ely, Minn.

Application August 28, 1931, Serial No. 559,850

1 Claim. (Cl. 43—28)

This invention relates to fishing tackle and has special reference to a novel form of snell or attachment intermediate of the line and the hook or lure.

The principal object is to provide a novel form of tackle for deep water fishing, and wherein the fish lure is insured against snagging on the bottom when thus fishing.

Another object is to provide means whereby the lure or hook is prevented from catching on weeds or the like when being drawn through the water.

Still another object is to provide means whereby when the snell becomes seriously entangled among weeds or the like, it may be drawn free by automatic dislodgment of the weight or sinker, with no other loss except that of the sinker.

Other objects and advantages of the invention will appear in the following description thereof.

Referring now to the accompanying drawing, forming part of this application, and wherein like reference characters indicate like parts:

Figure 1:
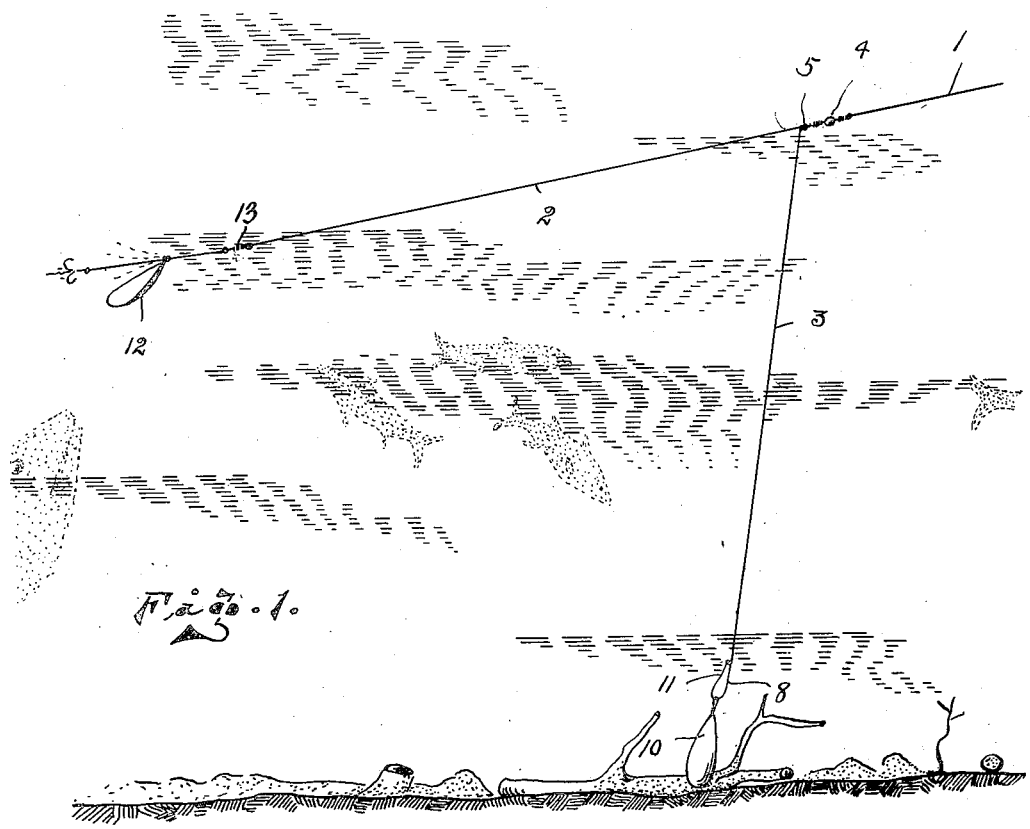
Figure 1 is an elevation of the improved snell as it might appear in action, maintaining the hook a substantially uniform distance above the bottom while being trolled.
Figures 2, 3:
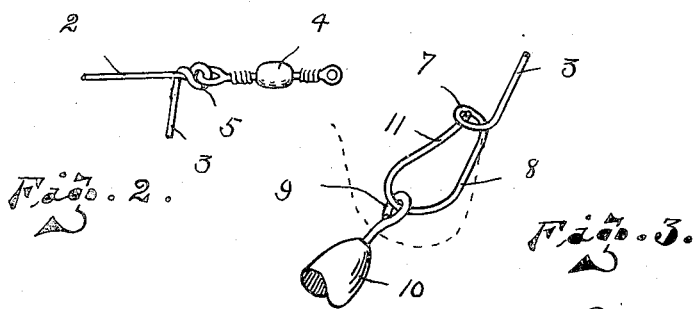
Figure 2 is an enlarged view of the apex connection of the snell.
Figure 3 is an enlarged perspective view of the automatically operated holdfast for the sinker.

1 represents the trolling or casting line and 2 and 3 the snell which is preferably made of spring wire of the proper strength and dimension to maintain its normal shape while being drawn through the water. The form here shown is substantially triangular with the controlling line attached as by the swivel 4 to the apex eye 5 of the snell; this eye having been formed by a simple twist of the snell wire. To the free terminal of the portion 3 of the snell is attached the sinker 10 and this attachment is novel in that the wire 3 is bent at right angles as at 7 forming a small right angularly disposed loop therein, thence downwardly and formed into a substantially semi-circularly shaped bight 8 in which the eye 9 of the sinker 10 is attached. The end 11 of the bight 8 is brought up and snapped into the loop 7 with but a short catching portion, so that in the event of the sinker 10 catching solidly upon a snag and the operator jerking hard thereupon, the free end 11 will be drawn out of the loop 7 and entirely free from the sinker eye if sufficient stress is put thereupon resulting only in the loss of the sinker and otherwise no damage to the hook or snell, so that a new sinker may be substituted with the least annoyance and expense.

To the free end of the portion 2 of the snell is pivotally attached as at 13 any desired form of lure or spoon 12 which as is obvious is held free and a predetermined distance above the bottom, for, when the device is being drawn adjacent the bottom, the sinker will go bobbing along same making its position in relation to the bottom quite perceptible to the fisherman as he can readily tell when the sinker touches bottom, and when it does the effect of course on the hook and portion 2 of the snell is to keep it elevated, for, as before stated, the snell is of spring wire and normally maintained at substantially right angular position.

Furthermore should this tackle be used in weedy waters and while being drawn therethrough either when casting or trolling, the portion 3 being in advance of the lure will engage the weeds or other obstruction and instantly upon such engagement tend to push the hook upwardly and over the obstruction, thus resulting in a substantially weedless hook, without in any way changing the appearance of the latter.

It is also obvious that when casting with such a device the sinker normally takes the lead through the air, and being the first to strike the water prevents any tendency of fouling while in such action, and again, when used in still fishing the sinker being heaviest will readily indicate its position when striking the bottom when the line may be held fairly taut as customary and assure uniform positioning of the lure above the bottom.

The advantage of being able to successfully fish in close proximity to the bottom of a body of water, especially during the warm weather portion of the year is well known to fishermen, and from the foregoing it is apparent that we have devised an exceedingly simple, practical, and efficient snell for such purpose.

Having thus described our invention, what we claim and desire to secure by Letters Patent, is

A device for releasing an entangled sinker of a fishing line comprising a resilient wire bent into arms positioned at an angle to each other, a line attaching element at the apex of the angle, a lure attaching device at the free end of one of the arms, a sinker attaching device at the free end of the other arm, the sinker attaching device comprising a loop formed in the resilient wire near its free end, the free end of the wire beyond the loop being formed into a resilient hook so disposed that the end of the hook may be sprung into detachable engagement with the loop whereby when a sinker is placed upon the hook and the hook is engaged with the loop an unusual strain upon the fishing line will detach the end of the hook from the loop and permit the hook to be detached from the sinker by a strain upon the line sufficient to substantially straighten the hook.

PETER SWANSON.
ROY BAXTRUM.